US012589471B1

(12) United States Patent
Bostic

(10) Patent No.: US 12,589,471 B1
(45) Date of Patent: Mar. 31, 2026

(54) POWER DRIVEN WRENCH WITH REMOVEABLE HEADS

(71) Applicant: Clifford Bostic, Belle Glade, FL (US)

(72) Inventor: Clifford Bostic, Belle Glade, FL (US)

( * ) Notice: Subject to any disclaimer, the term of this patent is extended or adjusted under 35 U.S.C. 154(b) by 477 days.

(21) Appl. No.: 17/969,416

(22) Filed: Oct. 19, 2022

(51) Int. Cl.
*B25B 21/00* (2006.01)
*B25F 5/02* (2006.01)

(52) U.S. Cl.
CPC .............. *B25B 21/002* (2013.01); *B25F 5/02* (2013.01)

(58) Field of Classification Search
CPC ..... B25B 21/00; B25B 21/002; B25B 23/147; B25B 23/1475; B25F 5/02
See application file for complete search history.

(56) References Cited

U.S. PATENT DOCUMENTS 2,436,650 A * 2/1948 Killmer .................. B23P 19/06 81/57.13
7,458,295 B1 * 12/2008 Lu ......................... B25B 21/004 81/63
8,172,697 B2 5/2012 Cackett et al.
2004/0093992 A1 * 5/2004 Wojtynek .............. B25B 13/467 81/57.3
2012/0279362 A1 * 11/2012 Cummings ............. B25B 13/56 81/57.11
2020/0215666 A1 * 7/2020 Schultz ................. B25B 13/465
2021/0154806 A1 5/2021 White et al.

* cited by examiner

*Primary Examiner* — Monica S Carter
*Assistant Examiner* — Kent N Shum
(74) *Attorney, Agent, or Firm* — Sanchelima & Associates, P.A.; Christian Sanchelima; Jesus Sanchelima

(57) ABSTRACT

A handle wrench assembly including a handle wrench that receives a head assembly including a head and including a battery housing assembly having a battery housing. The head attaches to said handle wrench in a top portion thereof by an attaching portion that conforms with the bottom of the head. The handle wrench has a hollow body to store a motor with an electronic member wherein the motor activates sprockets to transmit movement to head sprockets wherein the head sprockets connect to one of the sprockets from the handle wrench. The battery housing includes a battery that powers the electronic member and the motor which are activated by a trigger located in the exterior of the handle wrench to rotate a nut drive in the top distal end of the head.

1 Claim, 4 Drawing Sheets

POWER DRIVEN WRENCH WITH REMOVEABLE HEADS

BACKGROUND OF THE INVENTION

1. Field of the Invention

The present invention relates to power driven wrench with removable heads and, more particularly, to a power-driven wrench with removable heads that is powered by an internal motor system having interchangeable heads to fit in different fasteners easy to reach for any application.

2. Description of the Related Art

Several designs for power driven wrench with removable heads have been designed in the past. None of them, however, include an internal motor assembly to power an interchangeable wrench head in order to fit different sized fasteners.

Applicant believes that a related reference corresponds to U.S. Pat. No. 8,172,697 issued for an electric torque wrench with a replaceable battery and a interchangeable clamping head. Applicant believes that another related reference corresponds to U.S. patent No. 2021/0154806 issued for a cordless, battery powered box wrench with a battery. None of these references, however, teach of a pneumatic or motor driven wrench for use in hard areas to reach that is comprised of a wrench style tool assembly with interchangeable flat working heads that can be swapped out to fit different sized fasteners.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a removable wrench head assembly to fit different sized fasteners according to standards to metric.

It is another object of this invention to provide a powered motor system to move removable wrench head to loosening or tightening hard reach areas.

It is still another object of the present invention to provide a functional system to keep motor in function due a charging battery and an engine switch to spin a removable wrench head.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
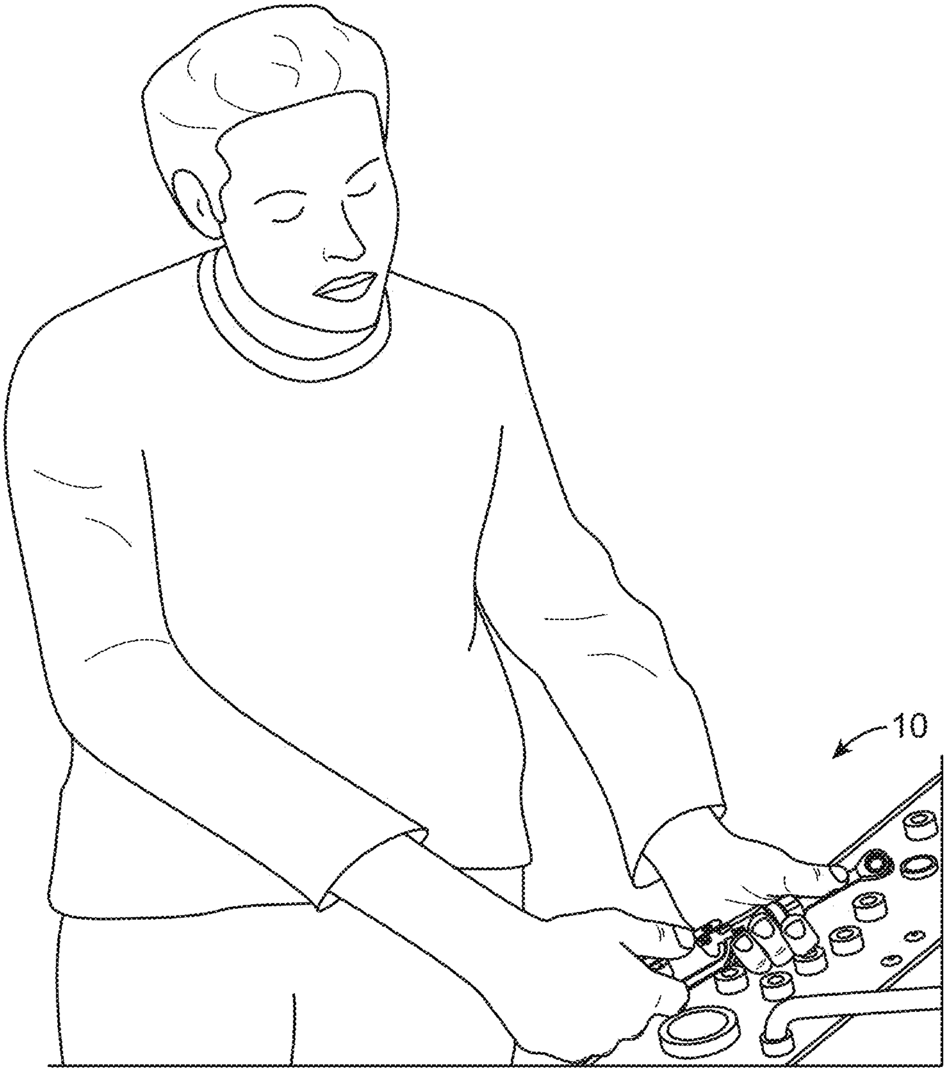
FIG. 1 represents and operational view where a user is tightening a nut or bolt with the present invention 10.

Referring now to the drawings, where the present invention is generally referred to with numeral 10, it can be observed that it basically includes a battery housing assembly 20, a handle assembly 40 and a head assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
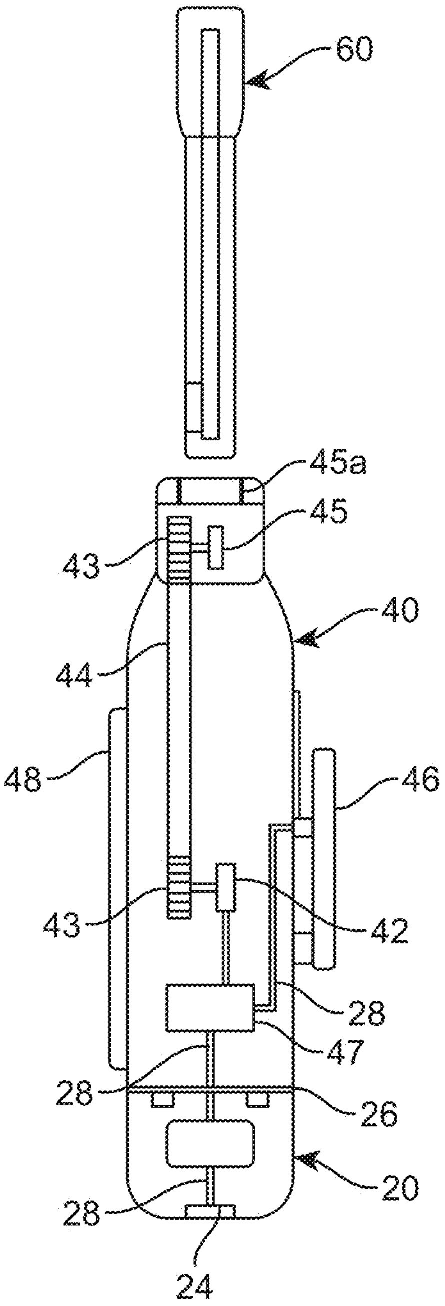
FIG. 2 shows a top cross-sectional view of the power-driven wrench with removable heads according to present invention.

The battery housing assembly 20 includes a battery housing 21, a battery 22, an input 24, a detachable portion 26 and wires 28. In a suitable embodiment, the battery housing 21 may have a shape that conforms with the body of the bottom of the handle assembly 40. The battery housing 21 may be made of a high-quality plastic. In a suitable embodiment, the battery housing 21 may have a cylindrical. Nevertheless, in other embodiments, the battery housing 21 may have a rectangular body, square body, cone body, pyramid body, or any other variation thereof. It is to be considered that the battery housing 21 may be configured to store the battery 22, the input 24 and wires 28. The battery 22 in a suitable embodiment may be a lithium-ion battery which can be adapted in the bottom portion of the handle assembly 40. The battery 22 may be configured to allow the head assembly 60 to operate. In a suitable embodiment, the battery 22 may have a rectangular body that conforms with the shape of the battery housing 21 as best observed in FIG. 4. Nevertheless, the battery 22 may have any other shape like a cylindrical, trapezoidal, square or the like. The battery housing 21 may have the input 24 located to a bottom portion thereof as illustrated in FIG. 2. In a suitable embodiment, the input 24 may be configured to connect any external wire to charge the battery 22. The input 24 may be any type in input like usb-micro, usb-type c, sub type a, or any other variation thereof to allow any external device to be connected and charge the battery 22.

In a suitable embodiment, the input 24 may be made of a metal material covered by plastic, the input 24 may also be made of a similar material that battery housing 21 may be made of. The battery housing 21 may include the detachable portion 26 which is in a top portion surface thereof allowing the battery housing to interlock with the bottom portion of the handle assembly 40. In a suitable embodiment, the detachable portion 26 may have a shape that conforms with the bottom of the handle assembly 40. The battery housing 21 may be configured to interlock the handle assembly 40 to allow the battery 22 to connect to the inner of the handle assembly 40 and allow to operate the head assembly 60. The detachable portion 26 may be made of a plastic material. Nevertheless, in other embodiments, the detachable portion 26 may be made of a metal material, steel material, silver material or any other variation thereof.

As best illustrated in FIG. 2, the wires 28 may be placed in the inner of the battery housing 22 connecting the input 24 with the battery 22. In a suitable embodiment, the wires 28 may be made of copper with plastic as a normal wire. It is considered that the wires 28 may be configured to connect the inner of the battery housing 22 and the handle assembly 40. The wires 28 may have an elongated cylindrical shape that conforms with the body of the battery housing 22 and the handle assembly 40.

The handle wrench assembly 40 includes a handle wrench 41, a motor 42, sprockets 43, a chain 44, an attaching portion 45, an aperture 45*a*, a trigger 46, an electronic member 47 and a gripping portion 48. The handle wrench 41 may have a cylindrical hollow body that conforms with the body of the battery housing 22. In a suitable embodiment, the handle wrench 41 may be configured to allow the user to grab the present invention 10. The handle wrench 41 may interlock with the battery housing by the bottom portion as best illustrated in FIG. 2. The handle wrench 41 may be suitable to be made of a high-quality plastic. Nevertheless, the handle wrench 41 may include materials like aluminum, steel alloy or any other variation that is covered of rubber thereof. The handle wrench 41 may include a motor 42 therein that activates the sprockets 43 transmitting movement through the chains 44 along the inner of the hollow body of the handle wrench 41 in a vertical configuration. The motor 42 in a suitable embodiment may be located to a bottom portion of the handle wrench 41 to transmit movement to the top portion thereof. In a suitable embodiment, the motor 42 may be connected by the wires 28 to the battery 22 which allows to power the motor 42. The motor 42 may be suitable to be connected to the electronic member 47 which allows the motor to operate by the trigger 46. In a preferred embodiment the motor 42 may be a bidirectional motor to allow the head assembly 60 operates in two directions. The motor may be made of a metal material. In another embodiment, the motor 42 may be in a central portion of the handle wrench 41.

Figure 3:
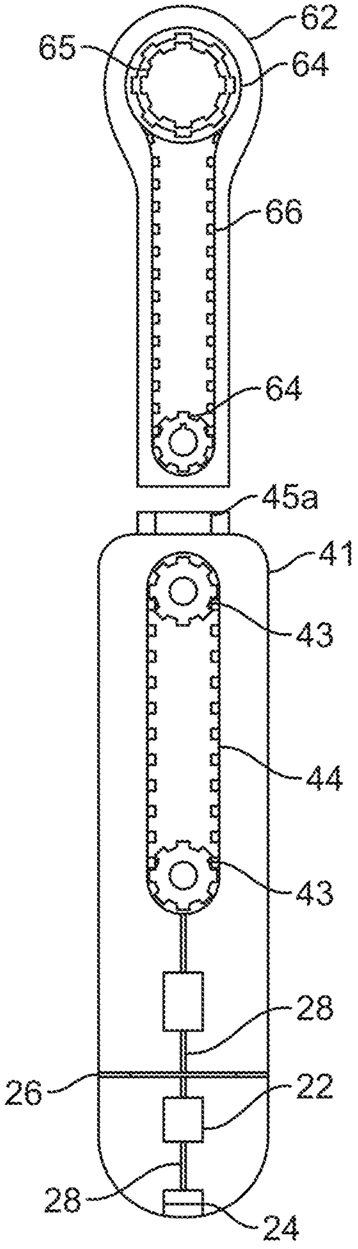
FIG. 3 illustrates a side cross sectional view of the present invention where is shown the mechanism used for moving the removable wrench head 62.

As shown in FIG. 3 the motor 42 may interlock one of the sprockets 43 which is connected to another of the sprockets 43 by the chain 44 which has a body that conforms with the sprockets 43 when interlocking the sprockets 43. The chain 44 may be configured to transmit the movement by the sprockets 43 to the head assembly 60. In a preferred embodiment one of the sprockets 43 may be located proximal to the motor 42 in a bottom portion of the handle wrench 41 while in another embodiment the other one of the sprockets 43 may be in a top portion of the handle wrench 41 wherein is located and attaching portion 45 to attach the head assembly 60 to allow to transmit the movement along the body of the handle wrench 41. The electronic member 47 may be a microcontroller device that allows the motor 42 when activating the trigger 46. In a suitable embodiment, the electronic member 47 may be connected to the trigger 46 by the wires 28 to allow the battery 22 with the electronic member 47 which is connected to the motor 42 and the trigger 46 allowing to activate the rotation of the chain 44. In a preferred embodiment, the electronic device 47 may have a square body. Nevertheless, in another embodiment, the electronic device 47 may have a rectangular body, a square body or any other variation thereof. The trigger 46 in a suitable embodiment may have an enlarged body that allows a user to grab. The handle wrench 41 may include the gripping portion 48 which is in an exterior portion thereof as best observed in FIG. 4. In a suitable embodiment, the trigger 46 may be located proximal to the gripping portion 48 which would allow the user to activate the motor 42 by the electronic member 45.

In one embodiment, the gripping portion 48 may be attached to a lateral side and cover a partial portion of the handle wrench 41. Nevertheless, in another embodiment, the gripping portion 48 may entirely cover the external surface of the handle wrench 41. The attaching portion 45 in a suitable embodiment may be in a top portion of the handle wrench 41 allowing the head assembly to be attached thereof. As best observed in FIG. 4 the aperture 45*a* which may allow the head assembly 60 to be inserted therein. The aperture 45*a* may be suitable to have a body that conforms with the inner of the attaching portion 48 and considering the shape that the head assembly 60 may have.

The head assembly 60 includes a head 62, head sprockets 64, a nut drive 65, a head chain 66, and a head attachment 68. The head 62 in a suitable embodiment, may have an enlarged body which would have a body that conforms with the handle wrench 41. As best observed in FIG. 4 the head 62 is configured to be attached to the top portion of the handle wrench 41 to the attaching portion 45. In a preferred embodiment, the head 62 may be made of a steel material which allows it to withstand the force applied when tightening or loosening a bolt or a nut in hard places to reach. It may be suitable for head 62 has indicia upon its external surface, wherein the indicia may be a brand. The head sprockets 64 in a suitable embodiment, may be attached to a top portion of the inner of the head 62 as illustrated in FIG. 3, the head sprockets 64 may be configured to be in a nut or a bolt. It is to be considered that the head 62 may be a detachable member which can be interchanged with any type of wrench head. It is also considered that the attaching portion 45 may be configured to receive any type of wrench of the variations that the head 62 may have. The head sprockets 64 may have a circular shape that conforms with the top distal end of the head 62. It is to be considered that the head sprockets 64 may also be made of a steel material or any alloy thereof. In a suitable embodiment, the nut drive may be placed in a top portion of the head 62 surrounding one of the head sprockets 64 which is placed in a top portion of the head 62. It is to be considered that the head 41 can be removable for any quick snap wrench with different size heads considering the standard Society of Automotive Engineers SAE 5/16, 3/4 or any variation thereof, considering also the metric 8 to 19 sizes.

Figure 4:
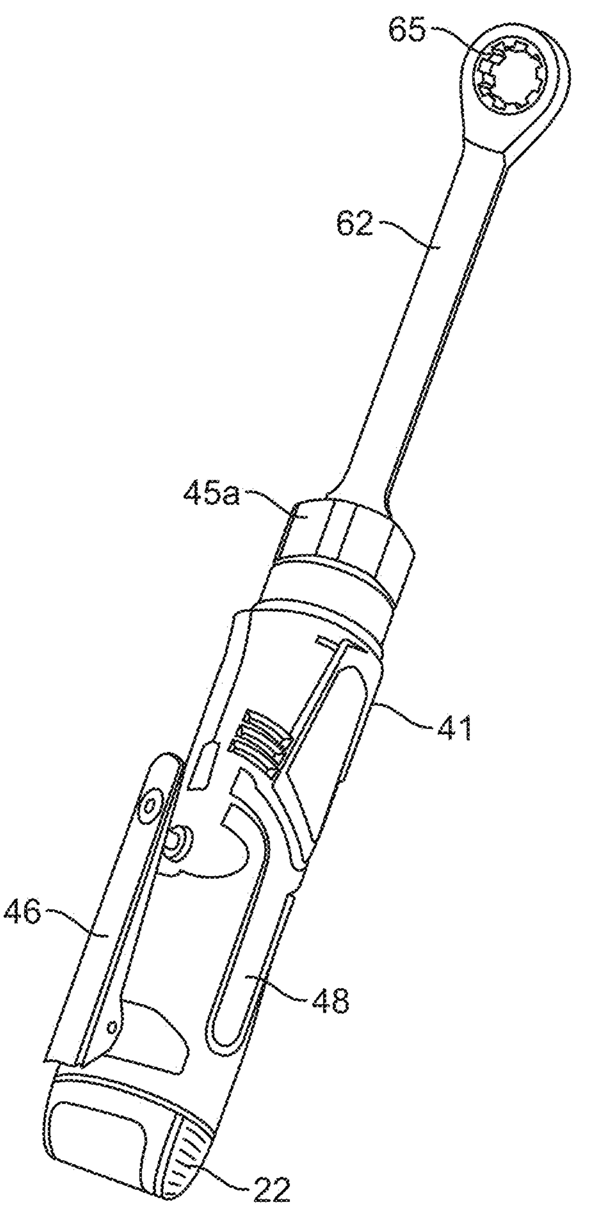
FIG. 4 is a representation of an exploded view of removable wrench head assembly 60 and wrench tool assembly 40.

As illustrated in FIG. 4 the nut drive 65 may be in an exterior portion of the top portion of the head 62 while one of the head sprockets 64 may be attached in the inner of the head 62 as best illustrated in FIG. 2. The head sprockets 64 may be attached to the inner of the distal ends of the head 62 related by a head chain 66 which may hold the head sprockets 64 by the perimeter thereof. In a suitable embodiment one of the head sprockets 64 which is in the bottom portion of the head 62 may be configured to be attached to the attaching portion 45 which may be connected to one of the sprockets 64 which may be in movement when activating the motor 42. In a preferred embodiment one of the head sprockets 65 may be configured to transmit movement to another of the sprockets 65 by the head chain 66 wherein the one of the sprockets 65 which transmit movement is configured to be attached to the attaching portion 45 wherein one of the sprockets 43 may be configured to transmit movement to one of the head sprockets 64 when activating the motor by the trigger 46 which may allow to change the direction of the nut drive 65 to allow the head to tighten or loosen allowing to reach hard placed when maneuver of moving the arms is required.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A power-driven wrench with removable heads, consisting of:

a battery housing assembly including a battery housing which interlocks with a handle wrench assembly that includes a handle wrench, said handle wrench configured to receive a head assembly including a head that interlocks with a top portion of said handle wrench that has an attaching portion that conforms with a bottom of said head, said head configured to be removable from said handle wrench to exchange different heads, said head including a nut drive located in a distal end thereof attached to one of a plurality of head sprockets, said head sprockets configured to rotate said nut drive, said head sprockets receiving movement from sprockets, said sprockets configured to transmit movement to one of the head sprockets by a chain and a head chain, said battery housing having a battery that relates to an electronic member which activates a motor by a trigger, said trigger located on an exterior portion of said handle wrench, said battery housing being removable to enable charging of the battery via an input located at a bottom portion thereof; wherein one of said sprockets is located at a bottom portion of said handle wrench proximal to said motor and another of said sprockets is located at a top portion of said handle wrench proximal to said head assembly.

* * * * *